United States Patent
Kim

(10) Patent No.: US 9,416,875 B2
(45) Date of Patent: Aug. 16, 2016

(54) APPARATUS FOR RETURNING TRANSMISSION TO PRIMARY MODE

(71) Applicant: SL Corporation, Daegu (KR)

(72) Inventor: Jung Ki Kim, Gyeongsangbuk-Do (KR)

(73) Assignee: SL Corporation, Daegu (KR)

( * ) Notice: Subject to any disclaimer, the term of this patent is extended or adjusted under 35 U.S.C. 154(b) by 281 days.

(21) Appl. No.: 14/190,657

(22) Filed: Feb. 26, 2014

(65) Prior Publication Data

US 2014/0352476 A1   Dec. 4, 2014

(30) Foreign Application Priority Data

May 31, 2013   (KR) ........................ 10-2013-0062776

(51) Int. Cl.
| | |
|---|---|
| *F16H 59/04* | (2006.01) |
| *F16H 63/34* | (2006.01) |
| *F16H 59/02* | (2006.01) |
| *F16H 61/24* | (2006.01) |

(52) U.S. Cl.
CPC ............ *F16H 63/3466* (2013.01); *F16H 59/02* (2013.01); *F16H 2059/0295* (2013.01); *F16H 2061/241* (2013.01); *Y10T 74/20085* (2015.01)

(58) Field of Classification Search
CPC . F16H 59/02; F16H 59/04; F16H 2059/0295; G05G 5/05
See application file for complete search history.

(56) References Cited

U.S. PATENT DOCUMENTS

| | | | | |
|---|---|---|---|---|
| 5,537,885 | A * | 7/1996 | Thomas | F16H 59/04 180/336 |
| 6,336,373 | B1 * | 1/2002 | Murai | F16H 59/105 192/220.4 |
| 7,712,392 | B2 | 5/2010 | Molkow et al. | |
| 2003/0188594 | A1 * | 10/2003 | Levin | F16H 59/044 74/473.12 |
| 2006/0053930 | A1 * | 3/2006 | Morita | F16H 59/10 74/473.18 |
| 2010/0024584 | A1 * | 2/2010 | Giefer | F16H 59/0204 74/473.18 |
| 2010/0071506 | A1 * | 3/2010 | Kliemannel | F16H 59/0204 74/625 |
| 2010/0263475 | A1 * | 10/2010 | Giefer | F16H 59/044 74/519 |
| 2010/0307276 | A1 * | 12/2010 | Giefer | F16H 59/10 74/473.3 |
| 2012/0137812 | A1 * | 6/2012 | Woo | F16H 61/32 74/473.12 |
| 2014/0033849 | A1 * | 2/2014 | Yamamoto | F16H 59/0217 74/473.12 |

FOREIGN PATENT DOCUMENTS

KR   10-2012-0061372 A   6/2012

* cited by examiner

*Primary Examiner* — Terence Boes
(74) *Attorney, Agent, or Firm* — Mintz Levin Cohn Ferris Glovsky and Popeo, P.C.; Kongsik Kim; Carolina Säve

(57) ABSTRACT

An apparatus for returning a transmission to a primary mode is provided. The apparatus includes a shift lever that is configured to shift a transmission and a motor that is configured to provide driving force to move the shift lever. In addition, a selecting unit receives the driving force from the motor and moves the shift lever in a selecting direction. A shifting unit receives the driving force from the selecting unit and moves the shift lever in a shifting direction. The shift lever is further configured to be moved to a first position by the selecting unit and to a second position by the shifting unit.

13 Claims, 12 Drawing Sheets

APPARATUS FOR RETURNING TRANSMISSION TO PRIMARY MODE

CROSS-REFERENCE TO RELATED APPLICATION

This application claims priority from Korean Patent Application No. 10-2013-0062776 filed on May 31, 2013 in the Korean Intellectual Property Office, and all the benefits accruing therefrom under 35 U.S.C. §119, the contents of which in its entirety are herein incorporated by reference.

TECHNICAL FIELD

The present invention relates to an apparatus for returning an automotive transmission to a primary mode, and more particularly, to an apparatus that returns an automotive transmission to a primary mode using a selecting unit and a shifting unit.

BACKGROUND ART

Automotive transmissions change gear ratios to constantly maintain the rotation of an engine based on the speed of a vehicle. To change the gear ratio, a shift lever which is included in the automotive transmission may be operated by the driver. Automotive transmissions may be classified into two types of transmissions: a manual transmission and an automatic transmission. In the manual transmission, a driver may manually change gears in the transmission and in the automatic transmission, the gears are automatically changed based on the vehicle speed in response to a drive (D) mode being selected by a driver.

There is another type of automotive transmission, i.e., a sport mode transmission that performs both a manual shift operation and an automatic shift operation. The sport mode transmission may perform the manual shift operation in response to a driver increasing or decreasing the gear ratio, and simultaneously, perform the automatic shift operation in parallel, or may include an automotive transmission together with a manual transmission.

However, a related-art shift operation mechanism generally requires substantial space and a significant amount of mechanical parts, thereby occupying most of the space for a gear console box into which a shift lever is installed. Accordingly, the space within the gear console box may not be properly utilized. Since the space between the driver's seat and the front passenger's seat is relatively narrow, the utilization of the space around a shift lever and the freedom of the design of a transmission may be decreased. In addition, conventionally, vehicles are often stopped even when the transmissions are not in a park (P) position. As a result, accidents may occur during the parking of a vehicle, or a vehicle may not be properly restarted.

SUMMARY

The present invention provides an apparatus for returning a transmission to a primary mode, which uses a selecting unit for moving a shift lever for shifting gears for a transmission in a selecting direction and a shifting unit for moving the shift lever in a shifting direction to return a transmission to a primary mode in response to the ignition of the vehicle being turned off and thus to improve the utilization of space and the freedom of the design of the transmission.

However, aspects of the present invention are not restricted to the one set forth herein. The above and other aspects of the present invention will become more apparent to one of ordinary skill in the art to which the present invention pertains by referencing the detailed description of the present invention given below.

An exemplary embodiment of the present invention provides an apparatus for returning a transmission to a primary mode and may include: a shift lever configured to shift a transmission; a motor configured to provide driving force to move the shift lever; a selecting unit configured to receive the driving force from the motor and to move the shift lever in a selecting direction; and a shifting unit configured to receive the driving force from the selecting unit and move the shift lever in a shifting direction. In particular, the shift lever may be configured to be moved to a first position by the selecting unit and to a second position by the shifting unit.

In addition, an exemplary embodiment of the present invention provides an apparatus for returning a transmission to a primary mode and may include: a signal generator configured to generate a return signal for returning a transmission to a primary mode; a power mode configured to generate power in response to the return signal; a first driving unit configured to shift the transmission by moving a shift lever in a first direction to a full stroke position using the power provided by the power mode; and a second driving unit configured to return the transmission to a park (P) mode by moving the shift lever in a second direction using the power provided thereto via the first driving unit.

According to exemplary embodiments, in response to the ignition of a vehicle being turned off, a transmission may be returned to a primary mode using a selecting unit, which may be configured to move a shift lever to shift the transmission in a selecting direction, and a shifting unit, which may be configured to move the shift lever in a shifting direction. Accordingly, accidents may be prevented during the parking of the vehicle and the restarting of the vehicle may be improved. In addition, the number of mechanical parts for shifting a transmission may be reduced compared to a related-art shift operation mechanism. Accordingly, the volume of a transmission may be reduced, thus improving the utilization of space and the freedom of the design of a transmission and minimizing the manufacturing cost of a transmission.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION

Figure 1:
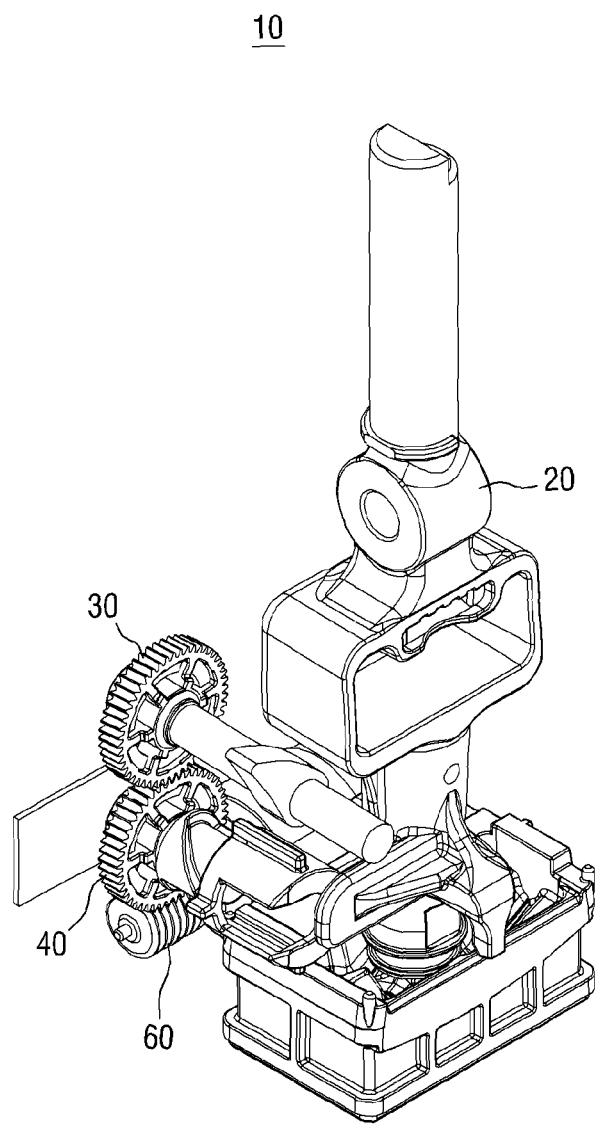
FIG. 1 is an exemplary view illustrating an apparatus for returning a transmission to a primary mode according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Exemplary embodiments are described herein with reference to cross-section illustrations that are schematic illustrations of exemplary embodiments (and intermediate structures). As such, variations from the shapes of the illustrations as a result, for example, of manufacturing techniques and/or tolerances, are to be expected. Thus, these exemplary embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

FIG. 1 is an exemplary view illustrating an apparatus for returning a transmission to a primary mode according to an exemplary embodiment. Referring to FIG. 1, an apparatus 10 for returning a transmission to a primary mode may include a shift lever 20 configured to shift gears for a transmission, a motor 60 configured to provide driving force to move the shift lever 20, a selecting unit 40 configured to receive the driving force from the motor 60 to move the shift lever 20 in a selected direction, and a shifting unit 30 configured to receive the driving force from the selecting unit 40 to move the shift lever 20 in a shifting direction. The shift lever 20 may be moved to a first position by the selecting unit 40, and may be moved to a second position by the shifting unit 30.

Further, a selecting gear 44 may rotate in response to the driving force that moves the shift lever 20 being provided by the motor 60 rotate, and the driving force may be provided to the selecting unit 40 via the rotation of the selecting gear 44. Then, the selecting unit 40 may be configured to move the shift lever 20 in a selecting direction. A shifting gear 32, which engages with the selecting gear 44, may be provided with rotation force due to a gear ratio, and thus may be configured to move the shift lever 20 in the selecting direction through the selecting unit 40. The gear ratio may be set to vary between vehicles, or may be set in connection with a shifting cam 34. The selecting unit 40 and the shifting unit 30 will be described later in further detail.

The first position may include a position of the shift lever 20 when the shift lever 20 is in a full stroke state. The full stroke state may be a state in which no more stroke is transmitted to the shift lever 20 since the operating stroke of the shift lever 20 reaches a maximum. The second position may include a primary position for activating the transmission in a primary mode with the shift lever 20 in the full stroke state. For example, the second position may be a position of the shift lever 20 for returning the transmission to a park (P) mode in response to the ignition of a vehicle being turned off.

The term "motor", as used herein, may indicate a device for converting electric energy into mechanical work by means of the force applied to a current within a magnetic field. Most motors generate power of a rotary motion, but also generate a linear motion. Motors are classified into a direct current (DC) motor and an alternating current (AC) motor and have electromagnetic force proportional to the intensity of a magnetic field, the intensity of a current and the length of a wire.

Figure 2A:
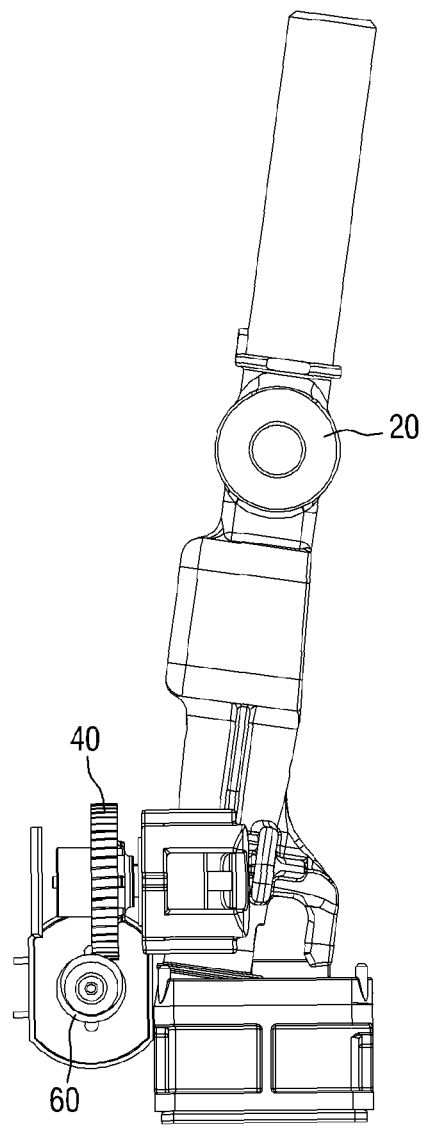
FIG. 2A is an exemplary front view illustrating the apparatus when a selecting unit is yet to be driven according to an exemplary embodiment of the present invention.
Figure 2B:
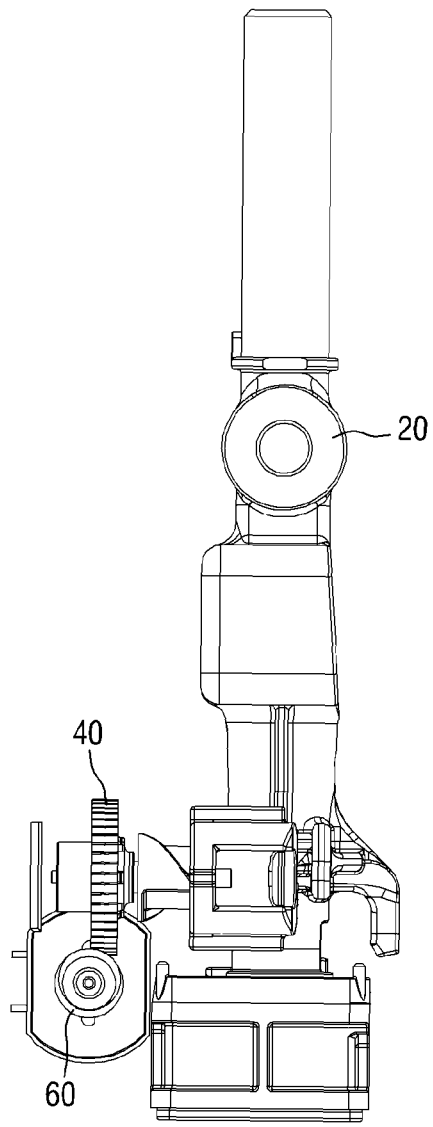
FIG. 2B is an exemplary front view illustrating the apparatus after the selecting unit is driven according to an exemplary embodiment of the present invention.
Figure 3:
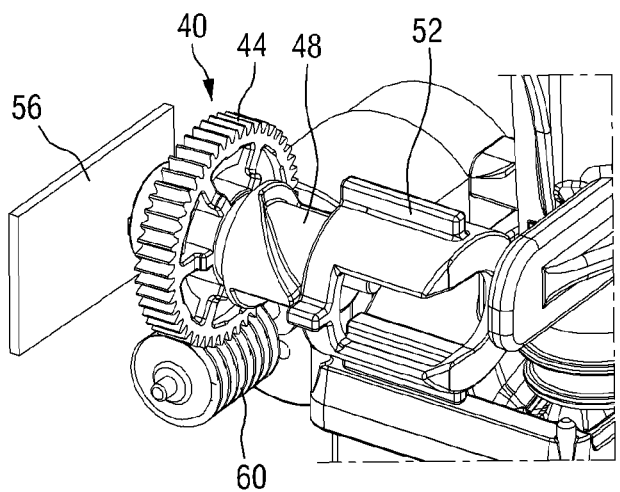
FIG. 3 is an exemplary enlarged view illustrating the selecting unit according to an exemplary embodiment of the present invention.

FIG. 2A is an exemplary front view illustrating the apparatus 10 when the selecting unit 40 is yet to be driven, FIG. 2B is an exemplary front view illustrating the apparatus 10 after the selecting unit 40 is driven, and FIG. 3 is an exemplary enlarged view illustrating the selecting unit 40. Referring to FIGS. 2A, 2B and 3, the selecting unit 40 may include the selecting gear 44 rotated by the driving force provided by the motor 60, a guide cam 48 connected to and rotated by the selecting gear 44, and a selector 52 connected to the guide cam 48 and configured to move the shift lever 20 in the selecting direction. The guide cam 48 and the selector 52 may be disconnected from each other in response to the shift lever 20 being at the first position.

The selecting gear 44 and the guide cam 48 may be rotated by the driving force provided by the motor 60. In addition, due to the rotation of the selecting gear 44 and the guide cam 48, the selector 52 may be configured to convert a rotary motion into a linear motion and move the shift lever 20 in the selecting direction. The guide cam 48 and the selector 52 may control an operating stroke using a cam shape. After a full stroke of the shift lever 20, the guide cam 48 and the selector 52 may be disconnected from each other, and thus may be rotated without changing the stroke. As a result, even when the shift lever 20 is at a full stroke position (i.e., the first position) the selecting gear 44 may be configured to transmit the power generated by the motor 60 to the shift lever 20 due to the gear ratio between the selecting gear 44 and the shifting gear 32.

Referring to FIG. 3, the apparatus 10 may also include a location control sensor 56 configured to identify the location of the shift lever 20 from the selecting unit 40. In response to the location of the selecting gear 44 of the selecting unit 40 being identified, the location of the shift lever 20 in the selecting direction may be determined based on the identified location of the selecting gear 44, and the location of the shift lever in the shifting direction may be determined based on the gear ratio between the selecting gear 44 and the shifting gear 32. The location control sensor 56 may be configured to use the magnetic force between itself and the selecting unit 40. The location control sensor 56 may include an optical sensor using a light source, rather than using magnetic force.

Figure 4A:
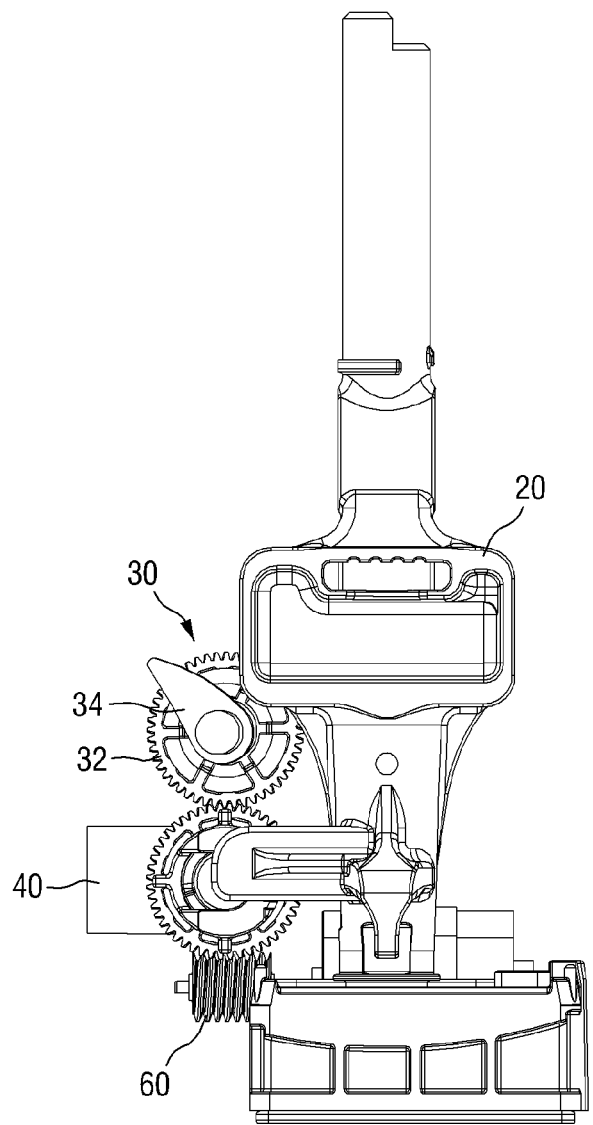
FIG. 4A is an exemplary right side view illustrating the apparatus when a shifting unit is yet to be driven according to an exemplary embodiment of the present invention.
Figure 4B:
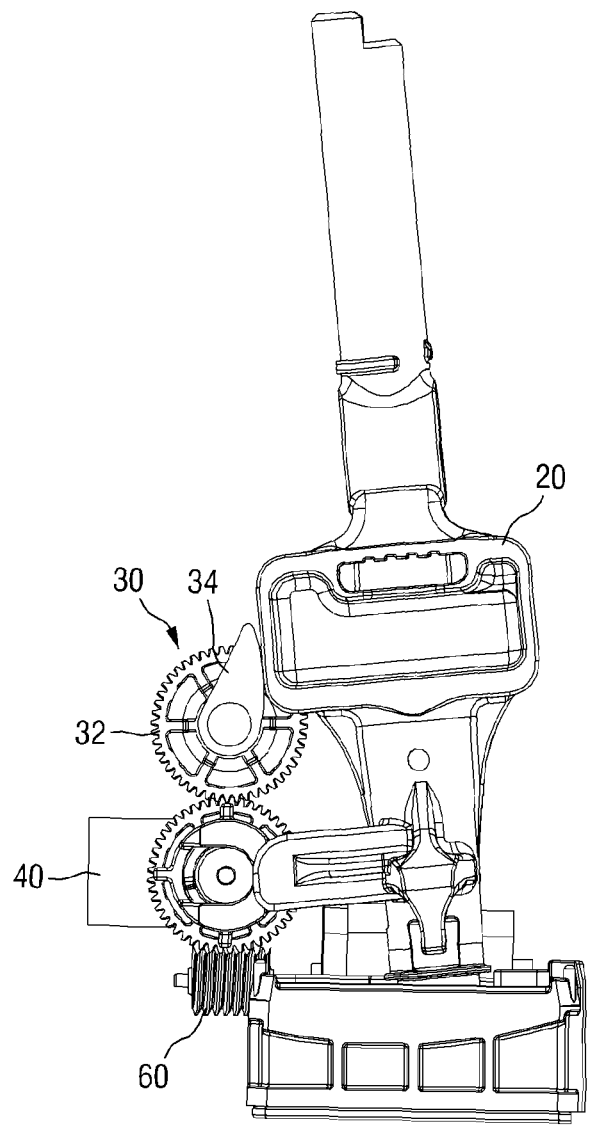
FIG. 4B is an exemplary right side view illustrating the apparatus after the shifting unit is driven according to an exemplary embodiment of the present invention.

FIG. 4A is an exemplary right side view illustrating the apparatus 10 when the shifting unit 30 is yet to be driven, and FIG. 4B is an exemplary right side view illustrating the apparatus 10 after the shifting unit 30 is driven. Referring to FIGS. 4A and 4B, the shifting unit 30 may include the shifting gear 32 rotated by the driving force applied thereto via the selecting unit 40 and the shifting cam 34 connected to and rotated by the shifting gear 32 to move the shift lever 20 in the shifting direction. The shifting cam 34 may contact the shift lever 20 at the first position. The shifting cam 34 may have a wing shape. However, there is nearly no limitation on the shape of the shifting cam 34 as long as the shifting cam 34 may be rotated to move the shift lever 30.

Figure 5A:
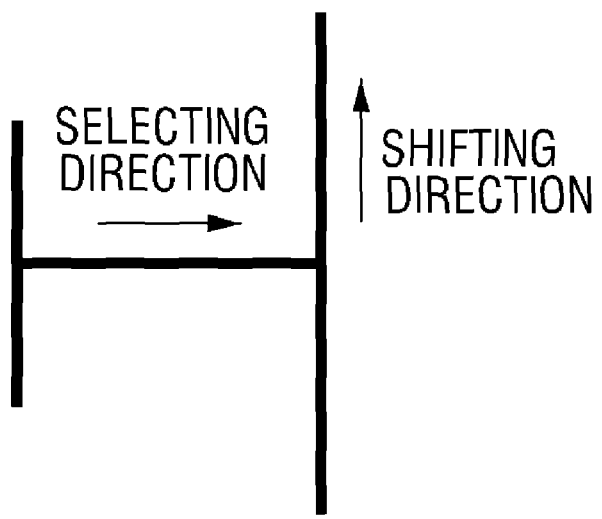
FIG. 5A is an exemplary view illustrating a pattern of movement of a shift lever of the apparatus according to an exemplary embodiment of the present invention.
Figure 5B:
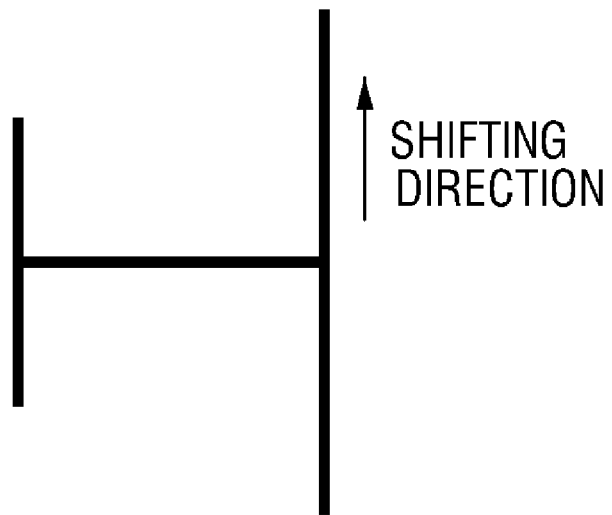
FIG. 5B is an exemplary view illustrating another pattern of movement of the shift lever of the apparatus according to an exemplary embodiment of the present invention.

FIG. 5A is an exemplary schematic view illustrating an example of a pattern of movement of the shift lever 20, and FIG. 5B is an exemplary schematic view illustrating another example of the pattern of movement of the shift lever 20. Referring to FIGS. 5A and 5B, in response to a gear stick being placed in a manual (M) position, the shift lever 20 may be moved in the selecting direction by the selecting unit 40 and then in the shifting direction by the shifting unit 30. In response to the gear stick being placed in a reverse (R) or drive (D) position, rather than in the M position, the selector 52 may not be operated, and instead, only the shifting unit 30 may be operated since the shift lever 20 is at a full stroke position (i.e., the first position). Accordingly, the shift lever 20 may be moved in the shifting direction without being moved in the selecting direction.

Figure 6A:
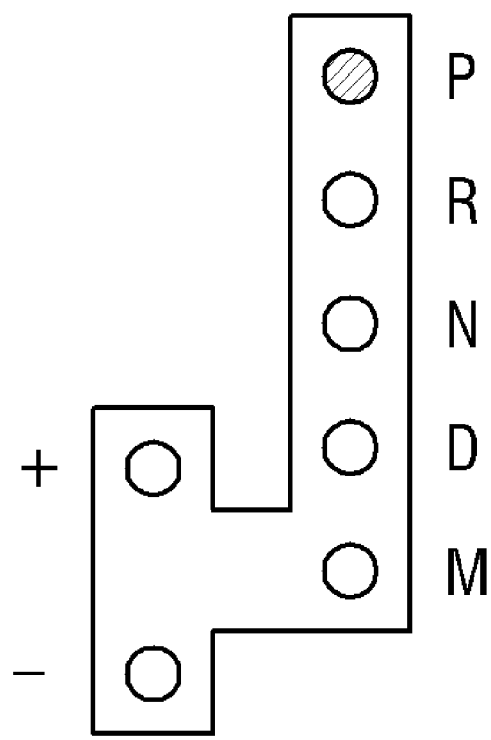
FIG. 6A is an exemplary plan view illustrating a shift panel according to an exemplary embodiment of the present invention.
Figure 6B:
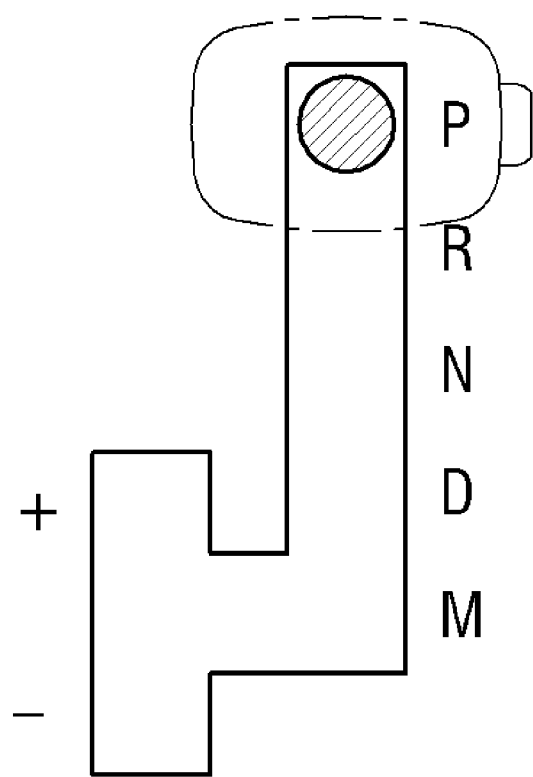
FIG. 6B is an exemplary plan view illustrating a shift panel according to another exemplary embodiment of the present invention.

FIG. 6A is an exemplary plan view illustrating a shift panel according to an exemplary embodiment, and FIG. 6B is an exemplary plan view illustrating a shift panel according to another exemplary embodiment. Referring to FIGS. 6A and 6B, the primary mode of the apparatus 10 may include at least one of a park (P) mode and a neutral (N) mode. In response to the ignition of vehicle being turned off or in response to a user setting, the selecting unit 40 and the shifting unit 30 may be sequentially driven to return the transmission to the P mode or the N mode. The shift panels illustrated in FIGS. 6A and 6B may be of a button type or a knob type, and are applicable to many types of shift panels including basic-type, center fascia-type, column shift-type, linear-type, step guide-type, tronic-type, and jog dial-type shift panels.

Figure 7:
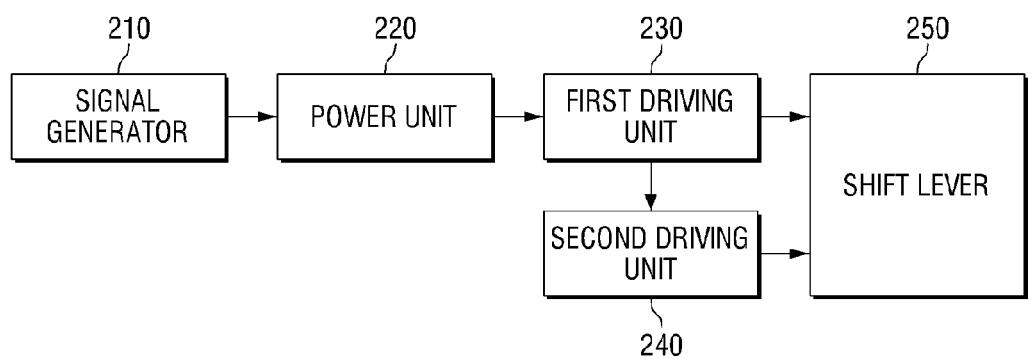
FIG. 7 is an exemplary block diagram illustrating an apparatus for returning a transmission to a primary mode according to another exemplary embodiment of the present invention.
Figure 8:
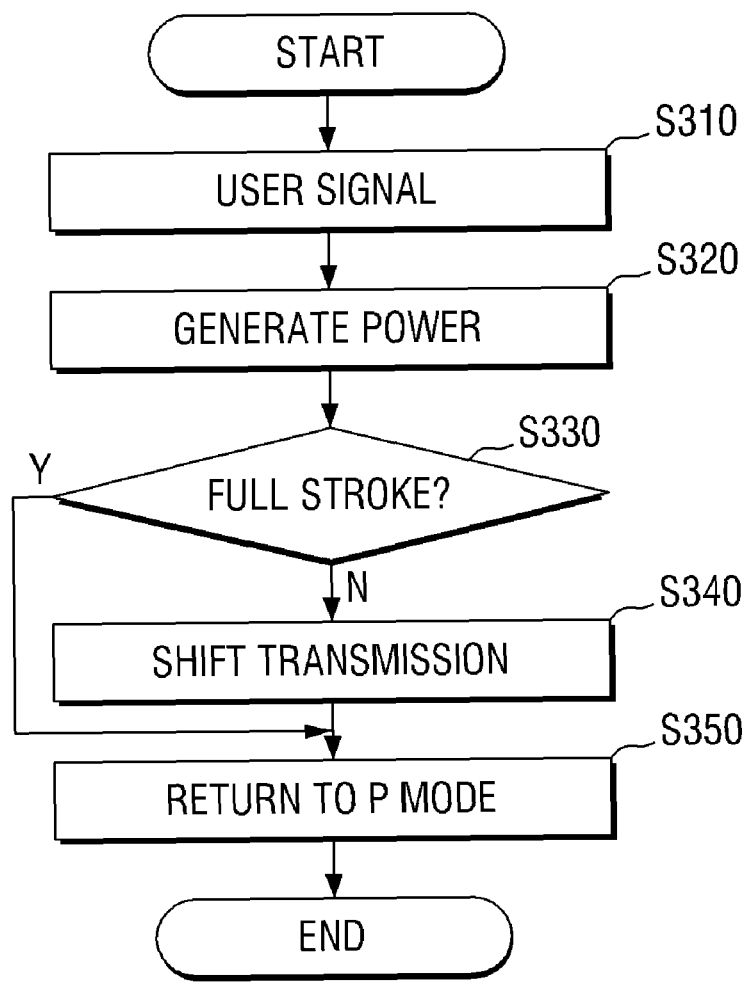
FIG. 8 is an exemplary flowchart illustrating an operation of the apparatus illustrated in FIG. 7 according to an exemplary embodiment of the present invention.

FIG. 7 is an exemplary block diagram illustrating an apparatus for returning a transmission to a primary mode according to another exemplary embodiment, and FIG. 8 is an exemplary flowchart illustrating an operation of the apparatus illustrated in FIG. 7.

Referring to FIGS. 7 and 8, an apparatus 10 for returning a transmission to a primary mode may include a signal generator 210 configured to generate a return signal for returning a transmission to a primary mode, a power unit 220 (e.g., a motor) configured to generate power in response to the return signal, a first driving unit 230 (e.g., the shifting unit) configured to shift the transmission by moving a shift lever 250 in a first direction by the power provided by the power unit 220, and a second driving unit 240 (e.g., the selecting unit) configured to return the transmission to a P mode by moving the shift lever 250 in a second direction by the power transmitted thereto via the first driving unit 230 (e.g., by the power mode 220).

The signal generation unit 210 may be configured to generate a signal (S310) in response to the receipt of a user signal and the power unit 220 may be configured to generate power (S320). In response to the shift lever 250 not being in a full stroke state, the shift lever 250 may be moved in the first direction by the first driving unit 230 (S340), and then in the second direction by the second driving unit 240 to return the transmission to the P mode (S350).

In response to the shift lever 250 being in the full stroke state, the first driving unit 230 may be configured to only transmit power to the second driving unit 240, and only the second driving unit 240 may move the shift lever 250 in the second direction to return the transmission to the P mode (S350). Therefore, in response to a parking mode being entered by a user or in response to the ignition of the vehicle being turned off, the signal generation unit 210 may be configured to generate the return signal, and the first driving unit 230 and the second driving unit 240 may be driven by the power unit 220 to return the transmission to the P mode. The primary mode to which the transmission may be returned by the apparatus 10 may include the P mode and an N mode.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. An apparatus for returning a transmission to a primary mode, the apparatus comprising:
   a shift lever configured to shift the transmission;
   a motor configured to provide driving force to move the shift lever;
   a selecting unit configured to receive the driving force from the motor and move the shift lever in a selecting direction; and
   a shifting unit configured to receive the driving force from the selecting unit and move the shift lever pivotally in a shifting direction,
   wherein the shift lever is further configured to be moved to a first position of the selecting direction by the selecting unit and to a second position of the shifting direction by the shifting unit, and
   wherein the shifting unit includes a shifting gear rotated by the driving force of the selecting unit and a shifting cam connected to and eccentrically rotated by the shifting gear to contact and move the shift lever in the shifting direction when the shift lever is in the first position.

2. The apparatus of claim 1, wherein the first position includes a full stroke position of the shift lever and the second position includes an initial position of the shift lever.

3. The apparatus of claim 1, wherein the selecting unit includes:
   a selecting gear configured to be rotated by the driving force received from the motor;
   a guide cam configured to be connected to and rotated by the selecting gear; and
   a selector configured to be connected to the guide cam to move the shift lever in the selecting direction,
   wherein the guide cam and the selector are further configured to be disconnected from each other at the first position.

4. The apparatus of claim 3, wherein the selecting gear and the guide cam are further configured to be rotated at the first position.

5. The apparatus of claim 1, further comprising:
   a location control sensor configured to identify a location of the shift lever from the selecting unit.

6. The apparatus of claim 5, wherein the location control senor uses magnetic force.

7. The apparatus of claim 1, wherein the shifting cam has a wing shape.

8. The apparatus of claim 1, wherein the primary mode includes at least one selected from a group consisting of: a park (P) mode and a neutral (N) mode.

9. The apparatus of claim 1, wherein the selecting unit and the shifting unit are further configured to be sequentially driven to return the transmission to the primary mode in response to the ignition of a vehicle being turned off.

10. The apparatus of claim 1, wherein the selecting unit and the shifting unit are further configured to be sequentially driven to return the transmission to the primary mode in response to a P mode being entered by a user.

11. An apparatus for returning a transmission to a primary mode, the apparatus comprising:
    a signal generator configured to generate a return signal for returning the transmission to the primary mode;
    a power mode configured to generate power in response to the return signal;
    a first driving unit configured to shift the transmission by moving a shift lever in a first direction to a full stroke position using the power provided by the power mode; and
    a second driving unit configured to return the transmission to a park (P) mode by pivotally moving the shift lever in a second direction using the power provided thereto via the first driving unit from the power mode,
    wherein the second driving unit includes a cam eccentrically rotated by a gear to contact and move the shift lever in the second direction.

12. The apparatus of claim 11, wherein the primary mode includes a park (P) mode.

13. The apparatus of claim 11, wherein the signal generator is further configured to generate the return signal in response to a P mode being entered by a user or the ignition of a vehicle being turned off.

* * * * *